Oct. 14, 1958 A. T. KOLTHOFF ET AL 2,855,676

TROUSER BACKPART HEIGHT-WIDTH DRAFTING SLIDE RULE

Original Filed Oct. 30, 1951

INVENTOR.

Aage Thowald Kolthoff

Hubert Louis Taylor

United States Patent Office 2,855,676
Patented Oct. 14, 1958

2,855,676

TROUSER BACKPART HEIGHT-WIDTH DRAFTING SLIDE RULE

Aage T. Kolthoff and Hubert Louis Taylor, New York, N. Y.

Division of application Serial No. 253,774, October 30, 1951. This application May 21, 1957, Serial No. 662,311

2 Claims. (Cl. 33—2)

This application is a division of the parent application of A. T. Kolthoff and H. L. Taylor, Serial Number 253,774 filed October 30, 1951, now Patent No. 2,818,649 for a Trouser Drafting Slide Rule.

This invention relates to slide rules, but particularly to slide rules for use by tailors in drafting the backpart of trousers.

The objects of this invention is to reduce the time required in drafting a trouser by the present methods; eliminate most of the dangers of errors resulting from the calculations and measurements necessary when drafting a trouser; standardize and make possible the continuous reproduction of any draft or feature drafted by this instrument without recourse to patterns but by merely refering to the written record of the numerical settings used in the instrument for the original draft; produce a transparent instrument dismantable for storing and of replaceable parts embodying along its edges design lines for trousers backparts and on its faces indexes, scales, matching lines and cut-outs necessary for designing the backparts of trousers. This trouser backpart height-width slide rule is to be used in conjunction with the trouser forepart slide rule claimed in the parent application No. 253,774 filed October 30, 1951, by the same applicants.

Briefly the following figures represent:

Figures 1, 3, 4:
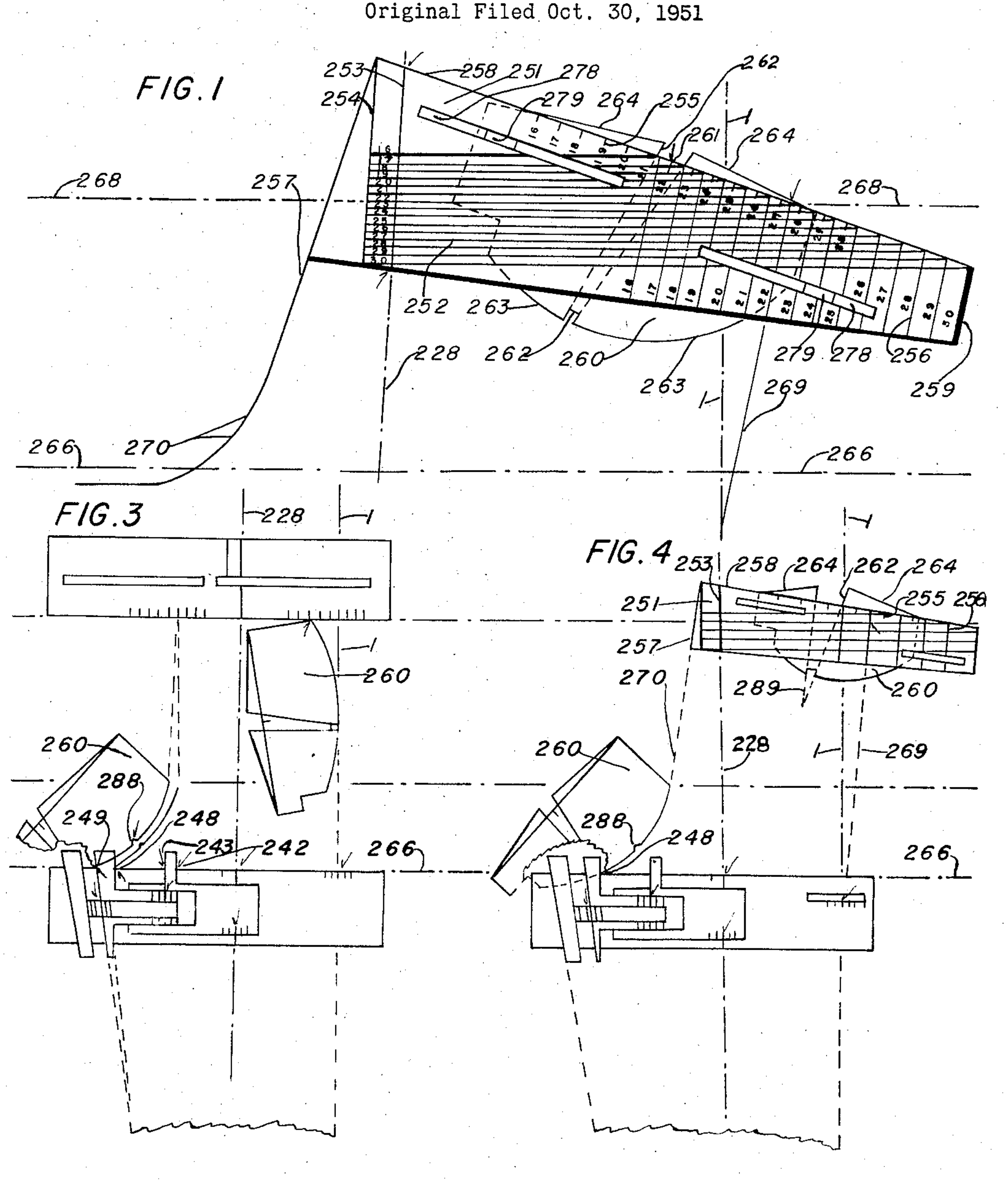
Fig. 1 is a plan view of the trouser backpart height-width drafting slide rule shown placed with mark 22 of the back height proportion scale on the draft waist line, and with its midway line on the draft midway line, so shown for the purpose of illustrating the use and function of the rule.
Fig. 3 is a draft of the trouser forepart.
Fig. 4 is a draft of the trouser backpart.
Figure 2:
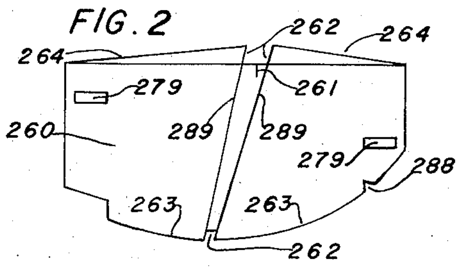
Fig. 2 is a plan view of the trouser backpart height-width drafting slide rule V suppression slide, alone, showing also its tongues, the V suppression index lines, and the fly notch.

Referring to Fig. 2, the V suppression index lines 289 running diagonally through the middle of the slide and intersecting at some point off the slide as a V marked on the slide, mark out the size and shape of the V suppression; and the V suppression cut-out 262 provides edges along the V suppression index lines 289 along which can be marked on the draft the size and shape of the V suppression. The V suppression scale matching index line 261 at the V suppression cut-out that splits the partial finished top index edge 264 is for matching with the marks of the scale bearing slide V suppression scale 255 (Fig. 1). The V suppression partial finished top index edge 264 is that part of the trouser top as outlined by the V suppression slide 260. The V suppression slide tongues 279 which project upwards for fitting into the scale bearing slide grooves 278 (Fig. 1) determine the path of the moving slides with respect to each other. They run parallel to the long axis of slide 260, one located on one side of the V suppression index lines 289 and near the partial finished top index edge 264; the other on the other side of the V suppression index lines 289 located near the crotch line shaper edge 263. The fly-notch 288 is an indentation in the V suppression slide 260 located at the proper distance from the right end of the crotch line shaper edge 263 such that if a check mark is put on the draft at this notch, the fly joining point of the two parts of the trouser will be established.

Referring next to Figs. 1 and 4, the trouser backpart height-width drafting slide rule is composed of the scale bearing slide 251 and the V suppression slide 260. In this particular embodiment the slide rule functions as follows: the V suppression slide tongues 279 (Fig. 1) slide in the scale bearing slide grooves 278 (Fig. 1) causing the scale bearing slide 251 to move along the V suppression slide 260 in a rectilinear motion allowing the marks of the scale bearing slide V suppression scale 255 to pass by the V suppression slide V suppression scale matching index line 261 and at the same time causing the extreme ends of the partial finished top index edge of slide 260 to move parallel to the partial finished top edge of slide 251.

Before placing the slide rule on the draft, slides 260 and 251 are moved over each other until the required mark on the scale bearing slide V suppression scale 255 coincides with the V suppression slide V suppression scale matching index line 261. In this position the mark covers the line and both appear as one line. In the example used mark 22 of scale 255 is matching the V suppression scale matching index line 261. With the slides in this relative position the slide rule is placed on the draft at the waist line 268 with slide 260 on the bottom and slide 251 on top of it. Maintained in this relative position the slides are moved until mark 22 of the scale bearing slide back height proportion scale 252 coincides with the draft waist line 268 while also the scale bearing slide midway line 253 coincides with the draft midway line 228. Now the drafting can be done by making a tracing of the back joining edge 257 of slide 251; of the partial finished top edge 258 of slide 251; of the partial finished top index edge 264 of slide 260; of the V suppression cut-out 262 of slide 260. The V suppression cut-out 262 is later prolonged on the draft until the V suppression index lines 289 (Fig. 4) intersect to form a V. The partial finished top index edge 264 of slide 260 is actually two straight lines or edges that would intersect at a peak were they not cut away by the V suppression cut-outs which leaves it as two separate lines or edges. Mark 22 of the back width proportion scale 256 of slide 251 is prolonged to intersect the draft construction line 1. The marks of scale 256 which are also the scale bearing slide backpart side seam run lines 259 (Fig. 1), once prolonged become the draft back part side seam run line 269 (Fig. 1). Mark 22 of scales 252 and 256 will intersect at the draft waist line 268. At this point of intersection a check is marked for reference. The tracing along the back joining edge 257 of slide 251 when prolonged becomes part of the draft back joining line 270.

When a pleated trouser is being drafted the scale bearing slide pleats midway line 254 (Fig. 1) is made to coincide with the draft midway line 228 instead of the midway line 253 during the initial placement of the slide rule on the draft. The balance of the draft back joining line 270 is produced by placing the V suppression slide 260 so that its crotch line shaper edge 263 (Fig. 1) lies along the prolongation of 257 and the draft crotch line 266 and then by tracing along edge 263. The fly notch 288 (Fig. 4) of slide 260 is also marked by the tracing along 263. Curve 263 is split by another part of the V suppression cut-out 262. The division marks of the back-height proportion scale 252 are lines extending diagonally from the pleats midway line 254 to intersect the partial finished top edge 258. The V suppression scale 255 is graduated along the partial finished top edge 258. The division marks of the back-width proportion scale 256 are lines parallel to the backpart side seam run line edge 259 and extend from the partial finished top edge 258 to the edge opposite it. The two long grooves 278 of slide 251 are staggered parallel to the partial finished top edge 258, one is closer to edge 258 than the other and extends from near the midway line 253 to near the middle of slide 251. The groove 278 farther from edge 258 extends from near the middle of slide 251 to near the backpart side seam run line edge 259.

Referring to Fig. 3, by use of the V suppression slide 260 the point at the right check mark at the waist line 268 is carried to the construction line 1 by tracing along the curved edge of slide 260. The points at check marks at 248 and 249 at line 266 are connected to the prolongations from points at check marks 242 and 243 at line 266 by tracing along the curved edge of slide 260. During the tracing the fly-notch 288 becomes indicated.

Modifications in the composition, configuration and disposition of the component parts that make up the invention as a whole is possible by those skilled in the art after profiting from this disclosure, therefore no limitation is intended by the phraseology of the foregoing specification or the illustrations accompanying the drawings.

We claim:

1. A trouser backpart height-width drafting slide rule comprised of a codependent scale bearing slide and a V suppression slide separable but slidably being guided and held together while sliding upon each other when setting out the limits of a trouser backpart and shaping the back joining the top finished edge, and establishing the V suppression lines, said scale bearing slide being elongated and having edges embodying design lines and edges for trousers, its partial finished top edge joined at one end to its back joining edge and at the other end to its back part side seam run line edge, said scale bearing slide having the pleats midway line beginning at the intersection of the back joining edge and the partial finished top edge and extending to the edge opposite the partial finished top edge, the midway line near to and parallel to the pleats midway line, a back height proportion scale whose division marks are lines extending diagonally from the pleats midway line to intersect the partial finished top edge, a V suppression scale graduated along the partial finished top edge, a back width proportion scale whose division marks are lines running parallel to the back part side seam run line edge extend from the partial finished top edge to the edge opposite it, each said division line of the back width proportion scale being also the back part side seam run line of a trouser, said scale bearing slide having two long grooves parallel to the partial finished top edge, one being closer to the said edge than the other, said groove closer to the partial finished top edge extending from near the midway line to near the middle of said slide, the other groove extending from near the middle of said slide to near its back part side seam run line edge.

2. A trouser back part height-width drafting slide rule as in claim 1, said V suppression slide being irregularly shaped and having straight and curved edges embodying design lines, points and edges for trousers, said V suppression slide having two V suppression index lines running slightly diagonally through the middle of said slide and intersecting at some point off said slide, a partial finished top index edge consisting of two edges that would intersect at a peak but which are split into two by the V suppression cut-out cut along the V suppression index lines, a V suppression scale matching index line at the V suppression cut-out that splits the partial finished top index edge, a curved crotch line shaper edge opposite the partial finished top index edge, said curved crotch line shaper edge split by another V suppression cut-out and having a fly notch cut in it near one end of the curve, said V suppression slide having two tongues parallel to its long axis, one tongue located on one side of the V suppression index lines and near the partial finished top index edge, the other located on the other side of the V suppression index lines but near the crotch line shaper edge, said tongues corresponding to the position of the grooves of the scale bearing slide to cause the extreme ends of the partial finished top index edge of the V suppression slide to move parallel to the finished top edge of the scale bearing slide.

No references cited.